United States Patent [19]

Townsend et al.

[11] Patent Number: 4,630,263
[45] Date of Patent: Dec. 16, 1986

[54] TIME-DIVISION MULTIPLEX COMMUNICATIONS CONTROL SYSTEM

[75] Inventors: Greg M. Townsend, Palatine; James A. Henderson, Jr., Streamwood; Russell A. Marten, Schaumburg, all of Ill.; Daniel C. Scavezze, Wapole, Mass.

[73] Assignee: Motorola, Inc., Schaumburg, Ill.

[21] Appl. No.: 511,692

[22] Filed: Jul. 7, 1983

[51] Int. Cl.[4] .......................... H04J 3/02; H04J 3/16
[52] U.S. Cl. ........................................ 370/85; 370/90
[58] Field of Search ...................... 370/85, 92, 96; 340/825.08, 825.5

[56] References Cited

U.S. PATENT DOCUMENTS

| | | | |
|---|---|---|---|
| 3,702,008 | 10/1972 | Groth | 370/96 |
| 3,883,855 | 5/1975 | Brightman et al. | 340/172.5 |
| 3,924,077 | 12/1975 | Blakeslee | 370/85 |
| 4,041,465 | 8/1977 | Conerly | 364/900 |
| 4,125,872 | 11/1978 | Maxwell | 364/900 |
| 4,140,877 | 2/1979 | Joslow et al. | 370/85 |
| 4,149,144 | 4/1979 | Diefenderfer | 370/85 |
| 4,160,124 | 7/1979 | Law | 179/2 |
| 4,161,786 | 7/1979 | Hopkins | 364/900 |
| 4,210,783 | 7/1980 | Vicari et al. | 179/18 |
| 4,227,178 | 10/1980 | Gergaud et al. | 370/96 |
| 4,228,499 | 10/1980 | Springolo et al. | 364/200 |
| 4,309,572 | 1/1982 | Mori et al. | 179/27 |

Primary Examiner—Douglas W. Olms
Assistant Examiner—Frank M. Scutch, III
Attorney, Agent, or Firm—Donald B. Southard; Edward M. Roney

[57] ABSTRACT

Method and apparatus are provided for bi-directional audio and data communications enabling a time-division multiplex control center system and distributed system intelligence enabling efficiency and reliability.

11 Claims, 9 Drawing Figures

TIME-DIVISION MULTIPLEX COMMUNICATIONS CONTROL SYSTEM

BACKGROUND OF THE INVENTION

This invention relates generally to a communications control center system and, more particularly, relates to a time-division multiplex system for both voice and data communications.

DESCRIPTION OF THE PRIOR ART

Time-division multiplex systems are well known in the communications art. Such systems have alternately been employed in voice communications and in multiple access data communications systems. Due to the different characteristics for voice and data, such systems have not been optimized to provide for simultaneous transmission of voice and data communications.

The most important factors to be considered in communications systems are efficiency, reliability and cost. Known systems are not as efficient, reliable and economical as the invention described herein.

SUMMARY OF THE INVENTION

It is accordingly an object of the invention to provide a novel and improved communications control center system for bidirectional audio and data transfer between a plurality of nodes.

It is a further object of the invention to minimize the number of redundant transmit and receive modules.

It is another object of the invention to minimize the amount of cabling between operator consoles and base stations.

Another object of the invention is to provide improved audio routing capability.

A further object is to provide efficient data throughput in the data channel.

Briefly, the present invention provides a communications control center system for bidirectional audio and data transfer between a plurality of nodes.

A method is provided for bi-directional audio and data transfer between a plurality of nodes including the steps of receiving an analog audio signal from any of the plurality of sources separately coupled to the plurality of nodes; converting said analog audio signal to a digital audio signal; providing time-division multiplex means for defining recurrent time slots; assigning each of the plurality of nodes to a separate recurrent time slot; assigning at least one time slot for data transfer between the plurality of nodes; routing said digital audio signal to enable transmitting to selected sources; converting said digital audio signal to analog audio signal; transmitting said audio signal to selected sources and controlling said dedicated data slot to provide each of the nodes equal access to transfer data between the nodes on said dedicated data slot.

Apparatus is provided to enable performing the method of the invention.

DESCRIPTION OF THE PREFERRED EMBODIMENTS

Figure 1:
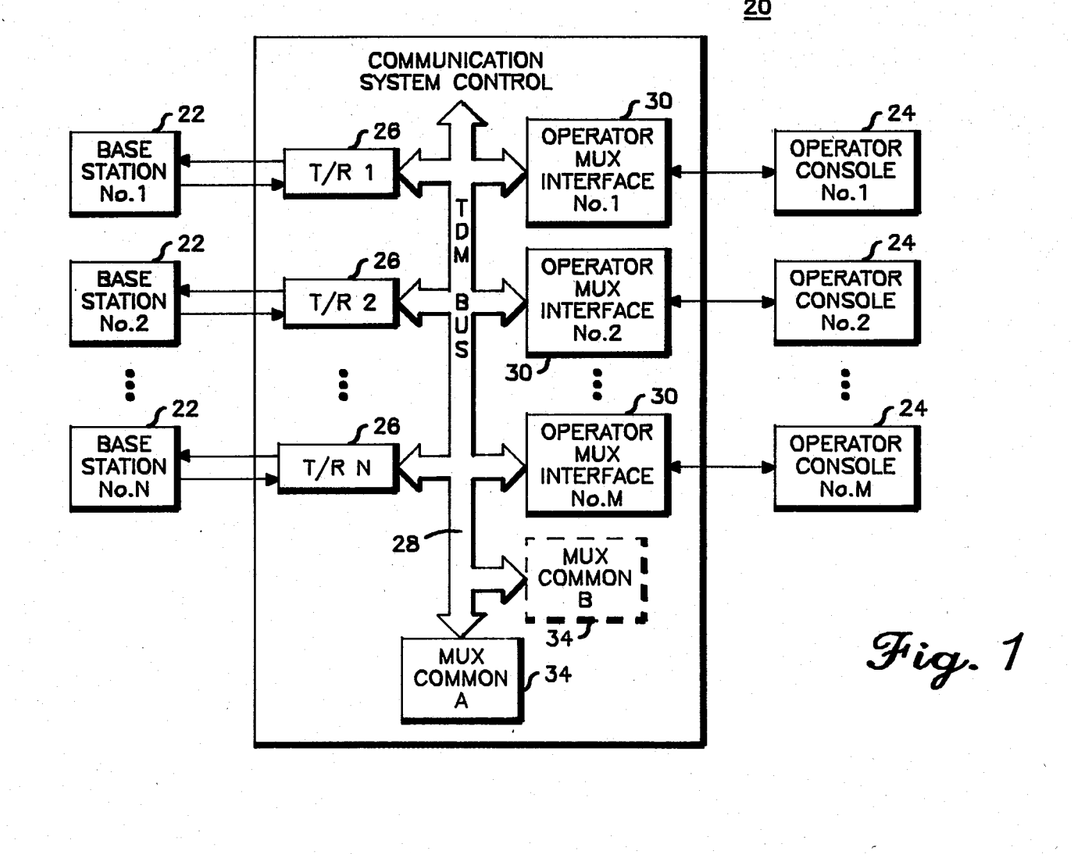
FIG. 1 is a generalized block diagram of a communications system illustrating the communications control center system according to the invention.

Referring to FIG. 1, there is shown a time-division multiplex communications control center system according to the invention and designated generally by the reference character 20. A plurality of sources including base stations number 1 through number N and designated generally by the reference character 22 and a plurality of operator consoles number 1 through number M and designated generally by the reference character 24 are connected for bidirectional audio and data transfer. The central control includes a plurality of nodes or transmit/receive modules number 1 through N corresponding to the number of base stations 22. The transmit/receive (T/R) modules 26 connect the base stations 22 to operator consoles 24 through a time-division multiplex bus 28. Additionally, a plurality of nodes, or operator multiplex (MUX) interface modules number 1 through number M, designated generally by the reference character 30, are provided between the time-division multiplex bus 28 and each of the operator consoles 24. A multiplex (MUX) common module 34 is connected to the time-division multiplex bus 28 to provide all the timing and control signals necessary for the operation of the system control 20. A redundant MUX common B module is shown as an optional element to provide increased system reliability in case of failure of the MUX common module 34. MUX common modules A, B can be provided to share control of the communications system fifty percent of the time, such that the possibility of an undetected failure in a standby module is avoided and a single failure of one module will not bring down the entire communications system 20.

Figure 2:
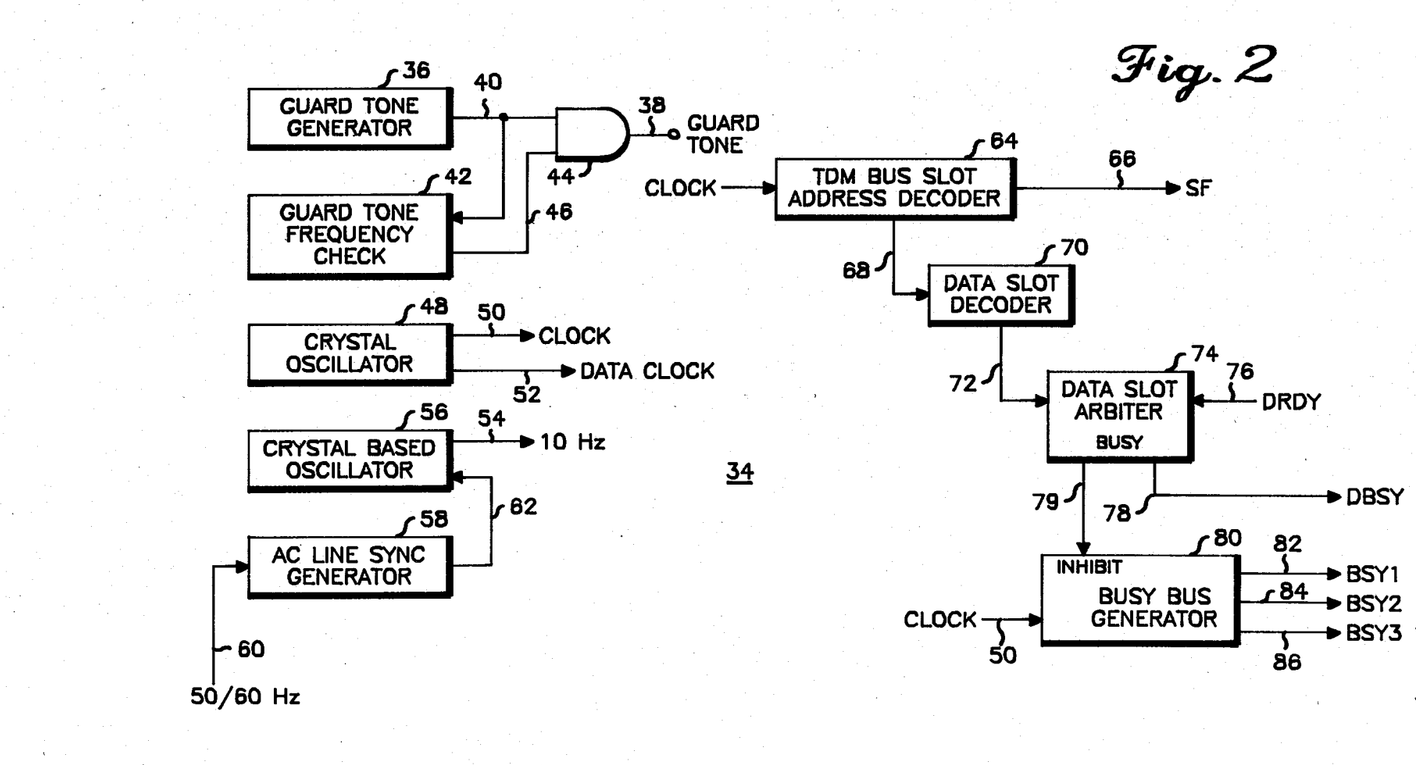
FIG. 2 is a block diagram illustrating the MUX common as shown in FIG. 1.

Referring to FIG. 2, there is shown a block diagram illustrating the MUX common module 34. MUX common module 34 includes a guard tone generator 36 to provide a guard tone signal 38 to all T/R modules 26 and operator MUX interface modules 30. The output signal 40 of guard tone generator 36 is coupled to a guard tone frequency check circuit 42 and an AND gate 44. Guard tone frequency check circuit 42 is provided to monitor the guard tone generator 36 for proper operation. Guard tone frequency check circuit 42 generates an output signal 46 that is coupled to AND gate 44. Signal 46 is a logic high as long as guard tone generator 36 operates properly. If a failure occurs because of either a frequency or a phase error, the guard tone frequency check circuit, switches the output signal 46 to a logic low which inhibits guard tone signal 38. The alternate MUX common module 34 may then be activated to take control.

A crystal oscillator 48 is employed to provide a clock output 50 and data clock output 52 to control the time-division multiplex bus and data bus. The frequency of crystal oscillator 48 is selected to provide an appropriate bit time for data and digital audio communications on time-division multiplex bus 28 and to T/R modules 26 and operator MUX interface modules 30. Additionally, a 10 Hz signal 54 is generated on the MUX common 34 to provide an additional real-time base clock signal to operator MUX interface modules 30. Crystal-based oscillator circuit 56 may be employed to generate the 10 Hz output signal 54. In order to maintain the desired accuracy of the 10 Hz signal 54, an AC line SYNC generator circuit 58 having a line frequency 50/60 Hz input signal 60 may be employed to provide a synchronizing signal 62 for the crystal-based oscillator circuit 56. Synchronizing signal 62 is employed to compensate for any skew in the crystal frequency and to maintain an accurate 10 Hz signal 54.

In a time-division multiplex bus 28, digital data are transmitted in binary-coded pulse groups during reoccurring time slots. The recurrence period of the group of time slots or frame may be defined to have a duration of 125 microseconds, with the frame including 32 slots, each having a duration of 3.9 microseconds. Each slot contains a group of 8 binary-coded pulses or bits, these 8 bits forming a word. Clock 50 may be approximately 2 Mhz giving a 64 Kbit/SEC data rate for the digital audio and data communications. The time-division multiplex bus can be, for example, three busses running in parallel for digital audio and one separate data bus. Each of the nodes 26, 30 is assigned to a predetermined slot in the TDM bus 28 for audio communications. Each of the nodes 26, 30 share a dedicated data slot on the data bus.

A time-division multiplex bus slot address generator 64 is provided on the MUX common 34 to enable transmitting and receiving data and digitized audio to the correct slot on TDM bus 28 corresponding to each of the nodes 26, 30. Clock signal 50 is input into TDM bus slot address generator 64 to enable counting the data bits in the frame. A start of frame (SF) signal 66 is output from the address generator. An output 68 of slot address generator 64 is connected to a data slot decoder 70. Data slot decoder 70 provides an output signal 72 corresponding to the dedicated data slot on the data bus that is shared by all nodes 26, 30. Data slot signal 72 is coupled to a data slot arbiter circuit 74. The data slot arbiter circuit 74 provides equal access to the dedicated data slot for all the nodes 26, 30.

Data slot arbiter circuit 74 synchronously polls each of the possible data sources 26, 30 for a request for use of the data slot. A data request (DRDY) signal 76 is received by data slot arbiter circuit 74 and a data busy (DBSY) signal 78 is generated by arbiter circuit 74 in response to the data request.

The data slot arbiter circuit 74 grants control of the dedicated data slot or slots on the data bus in response to a data request signal 76 from one of the nodes. Data slot arbiter circuit 74 provides a data busy (DBSY) signal 78 in response to data request signal 76. The inhibit signal 79 is input to an inhibit port of a busy bus generator 80, while the data slot is being used by one of the nodes.

Busy bus generator 80 provides for polling each of the time-division multiplex busses 28 such that each of the data sources 26, 30 have equal access to the data slot. Busy bus generator 80 provides output signals corresponding to the separate multiplex busses. For the example of three time-division multiplex busses for the digitized audio, busy bus generator 80 includes output signals 82, 84, 86 labeled BSY1, BSY2 and BSY3 corresponding to each of the three busses. The state of outputs 82, 84, 86 correspond to the multiplex bus that is being polled when the data slot is inactive, and sequentially change state for the duration of one data frame. When an inhibit signal 79 is received by busy bus generator 80, outputs 82, 84 and 86 are disabled to inhibit the polling process. The polling process is inhibited during the requesting node time slot and resumes with the next node following the requesting node after a predetermined number of frames, whereby each of the nodes 26, 30 are given equal access to transmit data.

A satisfactory MUX Common Module 34 has been constructed which may utilize the following commercially available parts:

| | |
|---|---|
| Guard Tone Generator 36, and crystal oscillators 48 & 56 | Any standard crystal oscillator |
| Guard Tone Frequency Check | D Flip/Flop (Motorola MC74LS-74) and Divider (Motorola MC4569) |
| AC Line Sync Generator 62 | D Flip/Flop (Motorola MC74LS-74) and NAND Gates (Motorola MC4093) |
| TDM Bus Slot Address Generator 64 | 4-Bit Counters (Motorola MC4520) and AND Gate (Motorola MC4082) |
| Data Slot Recorder 70 | D Flip/Flop (Motorola MC4013) and NOR Gates (Motorola MC4002) |
| Data Slot Arbiter 74 | D Flip/Flops (Motorola MC4013) and Presettable Counter (Motorola MC4526) and NOR Gate (Motorola MC4001) |
| Busy Buss Generator 80 | Ring Counter (Motorola MC4017), AND Gate (Motorola MC4081) and EX OR Gate (Motorola MC4070) |

Figure 3:
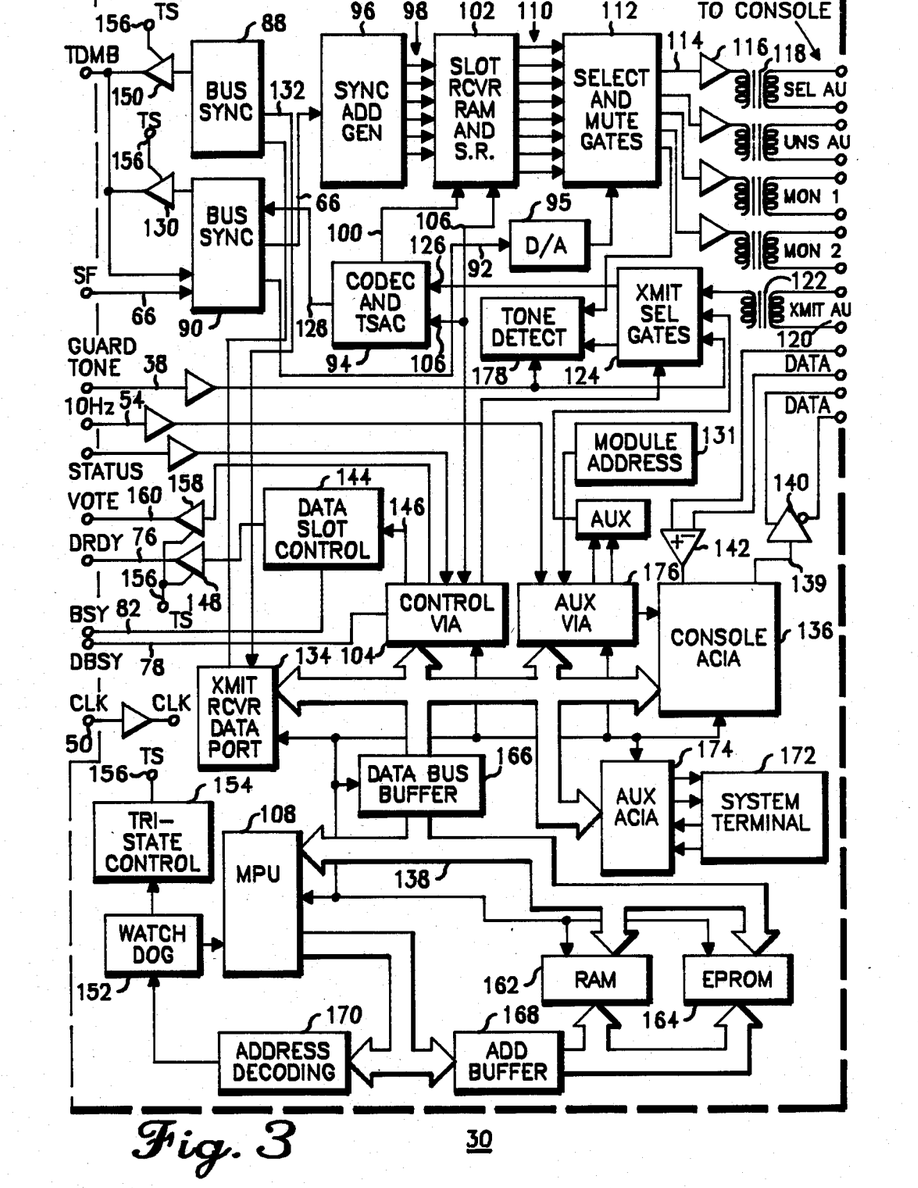
FIG. 3 is a schematic diagram illustrating an operator MUX interface module as shown in FIG. 1.

Referring to FIG. 3, there is shown a diagram illustrating the operator MUX interface 30. Operator MUX interface modules numbers 1 through M connect the operator consoles numbers 1 through M to the TDM bus 28. Data and digital audio is received from TDM bus 28 into bus sync modules 88, 90, respectively. The digital audio output signal 92 of bus sync module 90 is coupled to digital to analog D/A module 95. Module 94 is a combination digital to analog and analog to digital converter and the time slot assigner circuit (TSAC). A start of frame SF signal 66 is coupled through the bus sync module 90 to synchronous address generator (SYNC ADD GEN) 96 to enable slot timing. SYNC ADD GEN 96 provides address signals 98 to uniquely define each of the 32 slots on the bus. The address signals 98 and the digital programmable slot select logic signal 100 of CODEC and TSAC module 94 are coupled to a slot receiver random access memory and shift register module 102. The signals 98 provide the address that determines the byte in RAM 102 that contains the control data necessary for the digital audio received on that slot. This control data may be dynamically changed by an input signal 106 from the control versatile interface adapter 104 and signal 100 outputted by CODEC and TSAC module 94. The control VIA 104 serially writes data into the shift register and RAM module 102 and the TSAC module 94. The control data is written to the control VIA 104 by a microprocessing unit MPU 108.

The output 110 of RAM 102 is coupled to a select and mute gates module 112 according to the control data that has been written to the RAM 102. Signal 110 provides the mute and routing information needed by module 112 for a particular audio source corresponding to a time slot. D/A module 95 converts the digital audio to analog audio signal and outputs the converted signal to module 112. Module 112 provides a plurality of audio outputs 114 that are coupled to line drivers 116.

Line drivers 116 can be operational amplifiers acting as current sources for driving an audio transformer 118. The audio transformers 118 can be coupled to a standard twisted pair cable and connected to the operator console 24. The drivers 116 may be coupled to a variety of positions on the operator console, for example, a select audio, unselect audio, monitor 1, and monitor 2 positions.

The operator console 24 includes a transmit audio port 120 that is coupled through an audio transformer 122 to a transmit selector gate 124. The output of transmit selector gate 124 is coupled to the transmit input 126 of CODEC module 94. CODEC module 94 converts the audio input into an 8-bit pulse code modulation (PCM). The digital audio output signal of CODEC module 94 is controllably coupled to the bus sync module 90 by MPU 108. The bus sync module 90 synchronizes the digital audio 128 for output to the time-division multiplex bus 28 through a tri-state driver 130. Module address 131 provides the slot address to MPU 108 through AUX VIA 176. MPU 108 controls module 94 to enable audio output during that slot.

Operator MUX interface module 30 provides for bidirectional data communication from the time-division multiplex bus 28 to the operator console 24. Data from the data slot of time-division multiplex bus 28 is input to bus sync module 88. The transmit output 132 from bus sync module 88 is coupled to the transmit/receive data port 134. Transmit/receive data port module 134 is coupled through MPU 108 to the console asynchronous communications interface adapter ACIA 136 through a data bus 138. The console ACIA 136 is a full duplex, asynchronous, low-speed, serial data link. The outgoing data 139 from console ACIA 136 can be level shifted by an open collector inverter 140. The ACIA 136 adds start and stop bits when writing data 139 to the console 24 and provides the data at a rate that is compatible with the console 24.

Data is received by the console ACIA 136 through a differential receiver 142 from the operator console when the operator console wishes to transmit a data packet.

At least one dedicated slot on the data-time division multiplex bus 28 is provided for all data communications between the microprocessing units on the T/R modules 26 and operator MUX interface modules 30. The data consists of a predetermined number of bytes forming a packet that can be sent during a predetermined number of successive frames. The data packet includes bytes defining start of text, source address, destination addresses and other information. The time allocation of the data slot is controlled by the data slot arbiter circuit 74 on the MUX common module 34 (A or B module). A data slot control module 144 receives an input signal 146 from the control versatile interface adapter VIA 104 in response to the data from the microprocessor on the operator console 24. The data slot control module 144 generates a data request (DRDY) signal 76 in response to the input signal 146 and BSY82. DRDY signal 76 is coupled through a tri-state driver 148 to the time-division multiplex bus 28. The data request signal 76 is received by the data slot arbiter circuit 74 in the MUX common module 34 as shown in FIG. 2. The data slot arbiter circuit 74 generates a data-busy signal 78 in response to the data request 76. Data-busy signal 78 is coupled through control VIA 104 to MPU 108. The microprocessing unit 108 sends the data packet to one or more of T/R modules 26 on TDM bus 28. A tri-state driver 150 is used to drive TDM bus 28 from bus sync module 88 inputting the data.

A watchdog timer circuit 152 is employed to restart the microprocessing unit 108 if the MPU 108 gets lost or hung up in its program and on initial power-up.

A tri-state control module 154 is coupled to an output of watchdog timer 152 to provide a tri-state (TS) signal 156 to disable the tri-state bus drivers 150, 130, 148 and a vote bus driver 158. MPU 108 determines the vote signal 160. The vote signal 160 is provided when more than one MUX common module 34 is employed whereby the control of the communication system is shared by the MUX common modules 34.

Random access memory (RAM) 162 and read-only memory 164 are provided into the microprocessor bus 138 and are coupled to a data bus buffer 166 and an address buffer 168. An address decoding module 170 is provided in the microprocessor bus 138 and is coupled to the watchdog timer circuit 152.

The microprocessor bus 138 supports peripheral devices including a system terminal 172 that is coupled through an AUX ACIA module 174 to microprocessor bus 138. AUX ACIA 174 is coupled through an AUX versatile interface adapter (VIA) 176 to the transmit selector gate module 124 through MPU 108. Guard tone signal 38 is received from the time-division multiplex bus 28 and input into a tone detect module 178 and into the transmit selector gate module 124. The 10 Hz clock signal 54 is received from the time-division multiplex bus 28 and input to the AUX VIA 176. The tone detect module 178 is used by microprocessing unit 108 to perform various tests on the audio signal path.

A Satisfactory perator MUX Interface Module 30 has been constructed which may utilize the following commercially available parts:

| | |
|---|---|
| Bus Sync 88 and 90 | Hex D Flip/Flop (Motorola MC4174) |
| Sync Address Generator 96 | 256 Counter (Motorola MC4021) |
| Slot Receiver RAM and Shift Register 102 | 32 × 8 RAM (RCA LDP1824C) and Shift Register (Motorola MC74LS-164) |
| Select and Mute Gates 112 | Analog Multiplexer/DeMultiplexer (Motorola MC4051) |
| CODEC and TSAC 94 | Motorola parts MC14403 and MC44416, respectively |
| Data Slot Control 104 | Dual D Flip/Flop (Motorola MC4013) and NAND Gates (Motorola MC4011) |
| Tone Detect 178 | Dual Op-Amp (¼ Motorola MC3403), Dual 4-Bit Counter (Motorola MC4518) and D-Flip/Flop (Motorola MC4013) |
| Transmit Select Gates 124 | Analog Multiplex/Demultiplex (Motorola MC4051) |
| D-to-A Converter 95 | Digital-to-Analog Converter (PMI DAC88C) |
| Tri-State Amplifiers 38, 54, 130, 148, 150, and 158 | p/o Tri-State Buffer (Motorola MC4503) |
| Op-Amps 116 | Operational Amplifier (Motorola MC3403) |
| Control VIA 104 and Auxilary VIA 176 | Versatile Interface Adapter (Synertek SY6522) |
| Console ACIA 136 and | Asynchronous Communications |

| | -continued |
|---|---|
| Auxilary ACIA 174 | Interface Adapter (Motorola MC6850) |
| Transmit/Receiver Data Port 134 | Serial-to-Parallel Shift Register (Motorola MC74LS-299) and Parallel-to-Serial Shift Register (Motorola MC 74LS-165) |
| Data Bus Buffer 166 | Bi-Directional Transceiver (Motorola MC74LS-645) |
| RAM 162 | RAM (Toshiba TC5517) |
| EPROM 164 | ROM (Intel LD27128) |
| Microprocessor 108 | Microprocessor (Motorola MC6809) |
| Address Buffer 168 | Bi-directional Transceivers (Motorola MC74LS-645) |
| Address Decoding 170 | BCD to Decimal Decoder (Motorola MC74LS-138) |
| Watch Dog 152 | Counter (Motorola MC4520), NOR Gate (Motorola MC74L5-02), EX OR (Motorola ML74LS-86) and 14-bit Counter (Motorola MC4020) |
| Tri-State Control 154 | NAND Gates (Motorola MC4011) and OR Gates (Motorola MC4001) |

Figure 4:
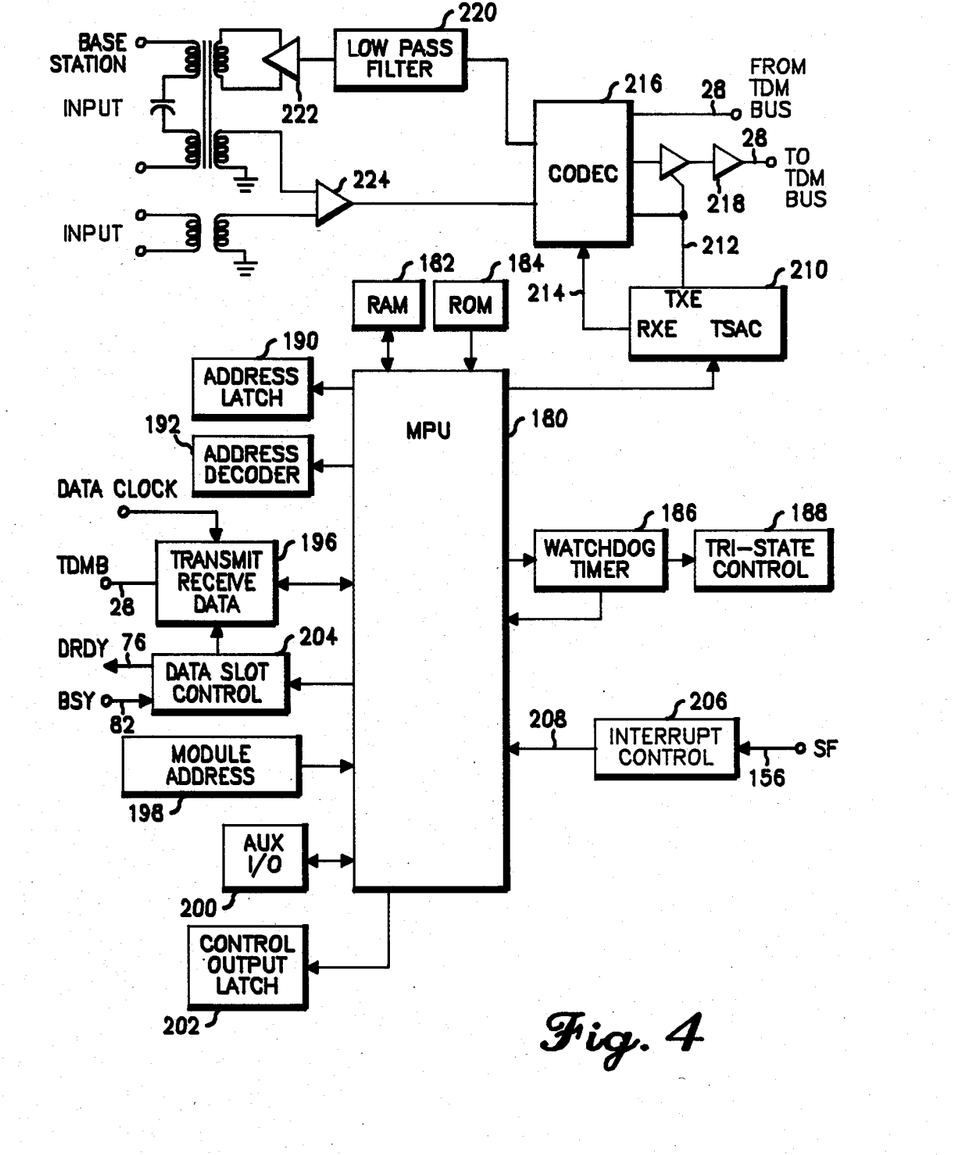
FIG. 4 is a block diagram block diagram illustrating a T/R module as shown in FIG. 1.

Referring to FIG. 4, there is shown a transmit/receive T/R module 26. A microprocessing unit 180 such as an MC 6803 is used to generate control logic for the T/R module 26. A random access memory (RAM) 182 and a read-only memory (ROM) 184 are provided in conjunction with the MPU 180. ROM 184 stores the control program for the microprocessing unit 180. A watchdog timer module 186 is provided to reset the microprocessor unit 180 in case of failure and for power-up reset. In the event of a failure of the microprocessor unit 180, a tri-state control module 188 is employed to provide a signal which disables the bus drivers and separates the T/R module 26 from the time-division multiplex bus 28.

An address latch module 190 is coupled to MPU 180 to receive the lower eight address bits from the data bus from the MPU 180. An address decoder module 192 is coupled to the microprocessor unit 180 and provides a low level on one of eight outputs depending on the address that microprocessor 180 is currently outputting on the address bus. The time-division data bus 28 is coupled to MPU 180 through a transmit/receive data port 196. Each of the T/R modules 26 is assigned to a predetermined slot on the system's time-division multiplex bus 28. A module address module 198 is coupled to MPU 180 and provides address programming input signal thereto similar to the function of the module address 131 on module 30. An auxiliary input/output module 200 is coupled to the microprocessor unit 180 for bi-directional data transfer therefrom to provide for an auxiliary input such as an additional decoder. A control output latch module 202 is coupled to MPU 180 and receives a control signal therefrom and provides output signals that are controlled by the MPU 180. The output signals from control output latch 202 are used to enable functions in various subcircuits of the T/R module 26.

A data slot control module 204 receives input signals from the time-division multiplex bus 28 and MPU 180. A busy bus signal 82 is coupled to the data slot control module 204 from TDM bus 28. The data slot control module 204 generates a data request signal 76 that is input to TDM bus 28. Additionally, data slot control module 204 provides an enable signal to the transmit/receive data port 196 to allow data flow to or from MPU 180 to the TDM bus 28. An interrupt control module 206 receives the start of frame signal 156 and provides an interrupt signal 208 to the MPU 180.

MPU 180 inputs a signal to a time slot assigner circuit TSAC 210 corresponding to the microprocessor 180 control. TSAC 210 provides a transmit enable signal (TXE) 212 and receive enable signal (RXE) 214 to enable data transfer to and from the time-division multiplex bus 28. A CODEC module 216 is used to convert the digital audio signal to an analog audio signal that is input from bus 28 and to convert an analog signal to digitized audio to insert into TDM bus 28. TXE 212 enables a tri-state buffer 218 and CODEC 216 to insert digital audio into TDM bus 28 during the correct time slot. RXE 214 enables CODEC 216 to receive digital audio from a slot on TDM bus 28 defined by MPU 180. CODEC 216 converts the digital audio to an analog signal that is coupled through a low pass filter 220 to a line driver 222. Line driver 222 sends the analog audio signal to the corresponding base station 22. The base station 22 can send audio signal to be inserted in the TDM bus 28 through CODEC module 216. The audio signal from base station 22 is input to an automatic level control 224 and coupled through to the CODEC 216.

A satisfactory Transmit/Receiver T/R Module 26 has been constructed which may utilize the following commercially available parts:

| Microprocessor 180 | Microprocessor (Motorola MC6803) |
|---|---|
| RAM 182 | RAM (Toshiba TC5517) |
| ROM 184 | ROM (Intel 2732) |
| CODEC 216 | Motorola Part 14403 |
| Low Pass Filter 220 | Quad Op-Amp (Motorola MC3403) |
| TSAC 210 | Motorola Part MC1416 |
| Watch Dog Timer 186 | (See parts listing for Watch Dog 152) |
| Tri-State Control 188 | (See parts listing for Tri-State Control 154) |
| Interrupt Control 206 | Dual D Flip/Flop (Motorola MC74LS-74) |
| Address Latch 90 | Buffers (Motorola MC74LS-367) |
| Address Decoder 192 | BCD to Decimal Decoder (Motorola MC74LS-138 |
| Transmit/Receive Data Port 196 | (See parts listing for Transmit/receive data part 134) |
| Data Slot Control 204 | NAND Gates (Motorola MC4011) |
| Control Output Latch 202 | Hex D Flip/Flop (Motorola MC74LS-174) |
| Aux. I/O 200 | Peripheral Drive (Motorola MC1413) and Buffer (Motorola MC4503) |

Now generally considering the operation of the communications control center system 20 with each of the sources, base station 22 and operator consoles 24 being capable of sending and receiving audio and data.

First consider sending audio from one of base stations 22 to any of the other sources 22, 24. The audio signal is sent from base station 22 to the corresponding node, T/R module 26. Referring to FIG. 4, the audio signal is coupled through the automatic level control ALC 224 to CODEC 216. For example, the audio signal can be converted into 64 KBPS PCM by CODEC 216. The converted, digital audio signal is inserted into the correct slot on TDM bus 28 corresponding to node 26, being enabled by TXE 212 from TSAC 210 according to MPU 180 control. TDM bus 28 couples the digital audio signal to nodes 26, 30. The T/R 26 receives the digital audio signal from TDM bus 28 into CODEC 216, being enabled by RXE 214 from TSAC 210 according to MPU 180 control and sends the converted analog signal through low pass filter 220 and line operator MUX interface drive 222 to the base station 22.

Referring to designated FIG. 3, the node 30 receives the digital audio signal through bus sync module 90 to CODEC and TSAC 94 and D/A 95. SLOT RCVR RAM and S.R. 102 under the control of 6809 MPU 108 determines whether the analog audio is sent to the corresponding source 24 and if so, the audio level.

Next consider sending audio from one of the operator consoles 24 to any of the sources 22, 24. The audio signal is sent from operator console 24 to the corresponding operator MUX interface 30 through an audio transformer 122 to a transmit selector gate 124. The audio signal is coupled through gate 124 to CODEC and TSAC 94. The digital audio signal output of CODEC 94 is controllably input into the correct slot on TDM bus 28 corresponding to node 30 according to MPU 180 control. Another operator MUX interface node 30 receives the digital audio signal from TDM bus 28 and the digital audio signal is then processed in the same way as described hereinabove in respect of audio being sent by a base station 22. Additionally, the T/R node 26 receives the digital audio signal and processes the signal as described with audio being sent by a base station 22. Finally, consider data communications between the nodes 26, 30 and operator consoles 24. Microprocessor units are provided in all T/R's 26, Operator MUX interfaces 30 and operator consoles 24. The microprocessors communicate with each other through the data communications network.

Operator consoles 24 send a data packet to the operator MUX interface module on a serial link through console ACIA to transmit/receive data port 134. Data is coupled to TDM bus 28 through BUS SYNC 88.

All operator MUX interface modules 30 and T/R modules 26 share the dedicated data slot on TDM bus 28. Referring to FIG. 2, data slot arbiter 74 and busy bus generator 80 included in the UX common 34 provide or collision-free operation and time allocation of the data slot.

The microprocessor 108 on the OMI 30 performs a multitude of tasks in controlling the operation of the console system. It receives change of state data from the operator console 24, e.g. a switch depression or release or the change of a volume control, and takes the appropriate action. This includes sending data to the T/R 26 as to what function to perform or to designate an audio slot to receive audio therefrom. It receives data from the T/R 26 and other OMIs 30 and takes appropriate action such as updating the led status at the operator console 24 and controlling the muting level and routing of the audio from the TDM bus 28 to the speakers on the operator console 24. The software in the OI 30 also determines which MUX common 34 is active and whether it is working properly.

Figure 5:
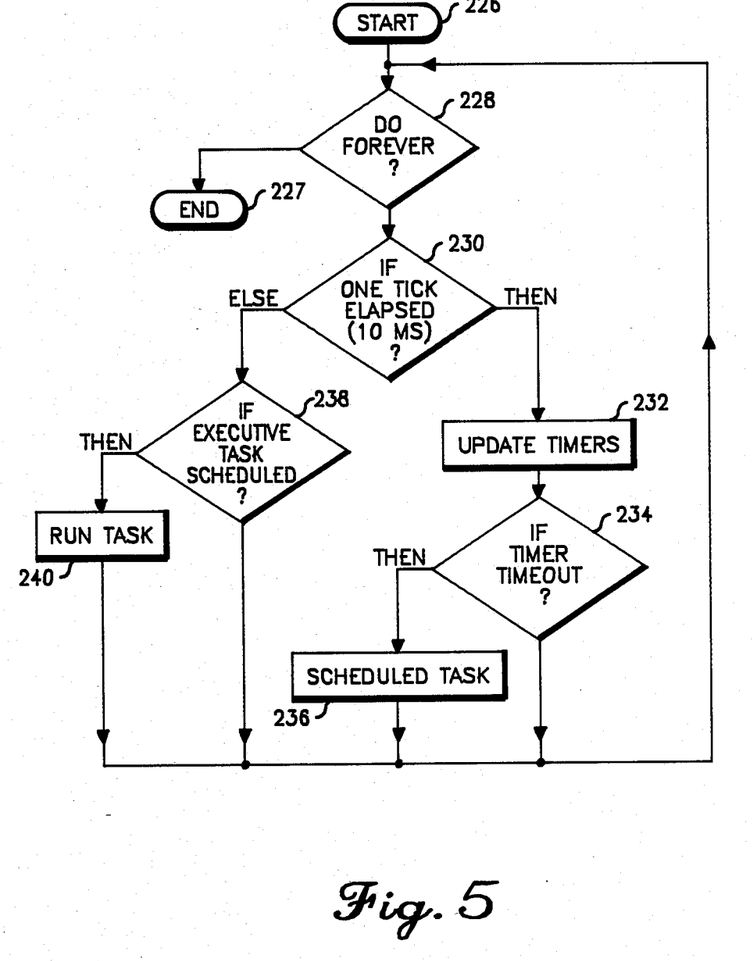
FIG. 5 is a logic flow diagram of the communications control center system as shown in FIG. 1.

Referring now to FIG. 5, there is shown a logic flow diagram for the control of the microprocessor 108 shown in FIG. 3 on each of the operator MUX interface modules 30. Once the microprocessor 108 has powered up, the KERNEL routine shown in FIG. 5 controls which routine will be allowed to run at any given time. Every routine must be called by the KERNEL to run and must return control to the KERNEL when finished. The fact that the KERNEL is the main control routine is illustrated by the do forever decision block 228. Only if the microprocessor 108 loses power or is reset by the watchdog timer 152 (FIG. 3) will the end block 227 of decision block 228 be executed. Decision block 230 determines whether to update the task counters or to check if there are any tasks to run. If one tick has elapsed, then the signal is passed to update timers that are set in the random access memory in block 232. Block 232 inputs a signal to decision block 234 that determines if the timers have timed out. If the timers haee timed out, then a signal is input to schedule executive task in block 236 and returned to the do forever block 228. If the timers have not timed out, the signal is returned to the do forever block 228 that is coupled back through block 230 for the decision if one tick has elapsed. If one tick has not elapsed, then a signal is input into block 238 to decide if an executive task is scheduled. If an executive task is scheduled, a signal is then input into the run executive task block 240. If an executive task is not scheduled, the signal is returned to the do forever block 228, and the cycle is repeated through do forever block 228.

Figure 6:
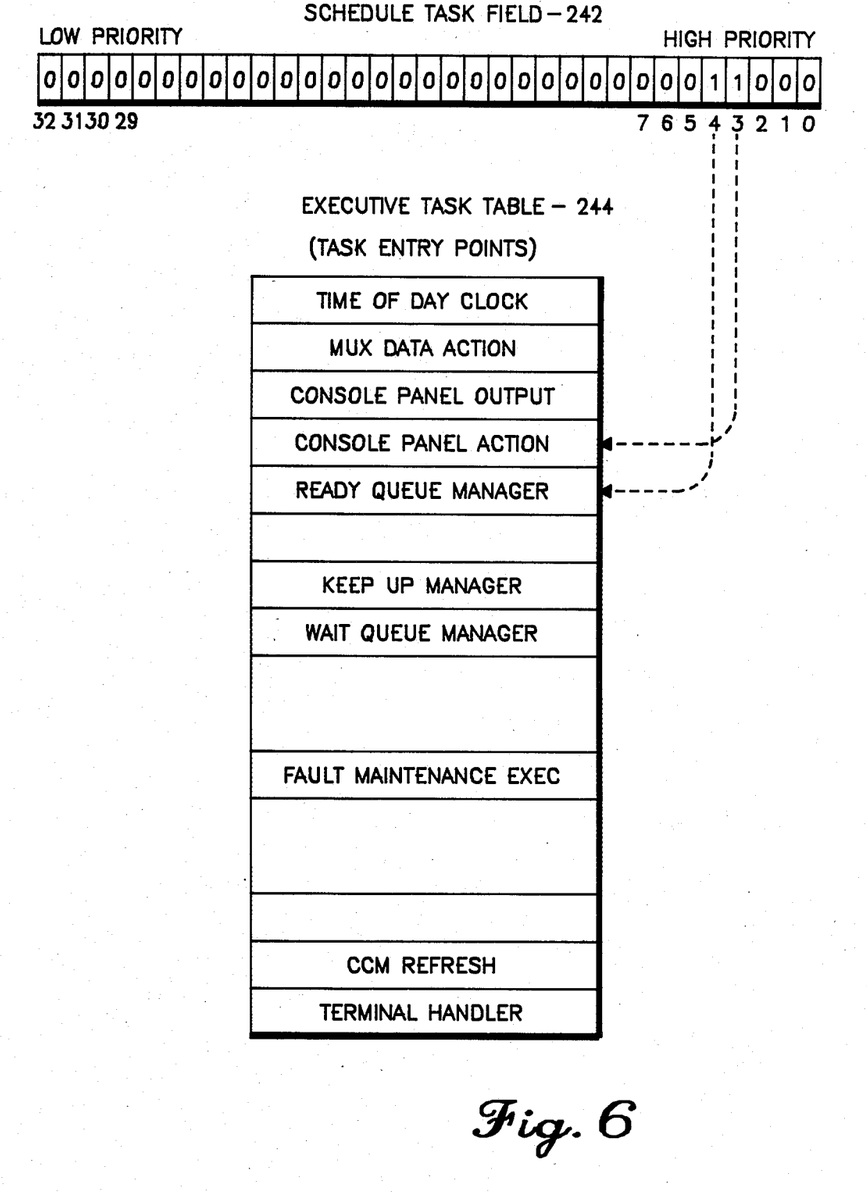
FIG. 6 is a table illustrating tasks and a schedule task format for coding the priority of tasks.

Referring now to FIG. 6, there is shown a table illustrating various executive tasks and a schedule task field for coding the priority of tasks. A given task is scheduled by setting a bit in the scheduled task field corresponding to the task table 244. These tasks can be scheduled by other tasks, via external interrupts to the microprocessor 108 or be self-scheduling by putting a timed task in a queue which will schedule the routine when it times out. Priority at the executive task level is achieved by searching the scheduled task field from right to left and running the first task whose bit is set to a one.

Figure 7:
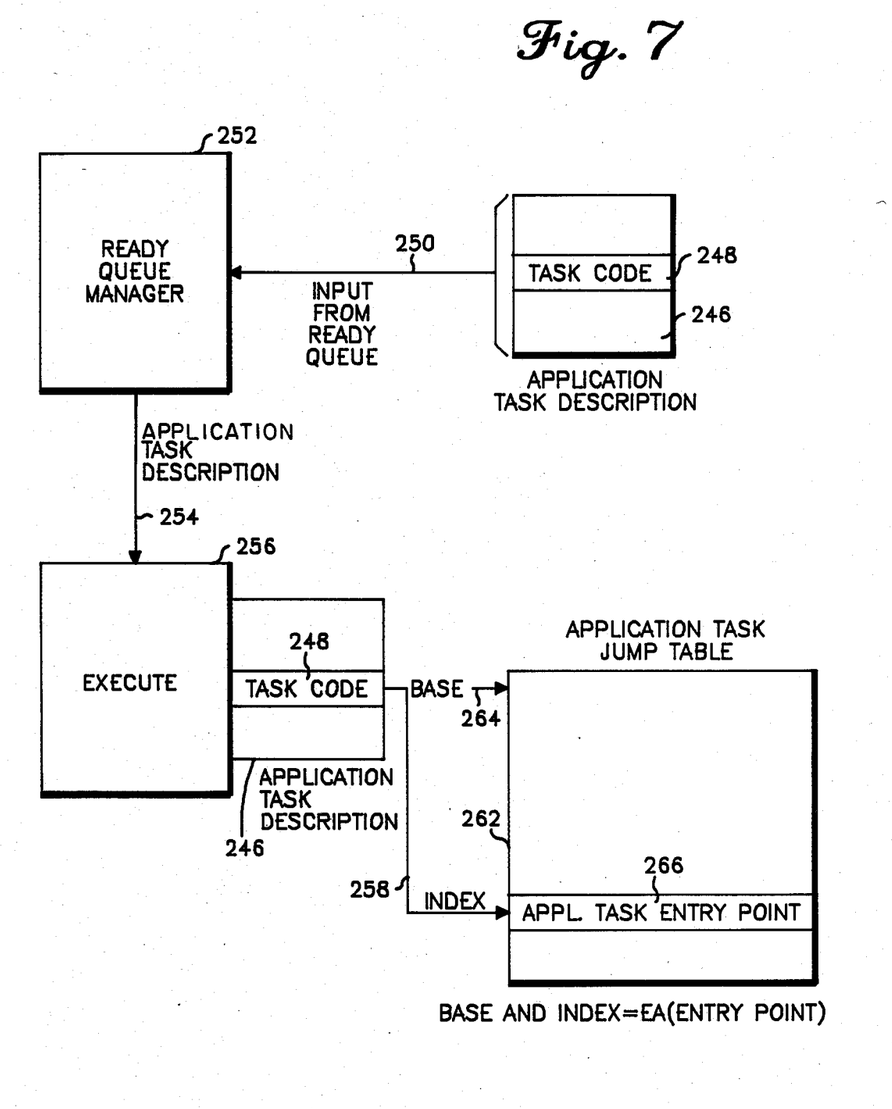
FIG. 7 is a flow diagram illustrating task execution.

Referring now to FIG. 7, there is shown a flow diagram illustrating task execution. An application task description block 246 is generated by the microprocessor 108 in response to another application task or to data being received, such as a response to a button being pushed on an operator console. The application task description, including a task code 248, is placed in a queue, and the ready queue manager 252 is scheduled by setting bit 4 (FIG. 6) in the schedule task field. When the KERNEL schedules the ready queue manager (box 240, FIG. 5), the ready queue manager removes the application task description 246 from the queue and passes it to task execution module 256. This module uses the task code 248 from the application task descriptor 246 to determine which application module to run. A base signal 264 defines the start of application task jump table 262. The base signal 264 and task code signal 24 define an index into the application task entry point 266 in the application task jump table 262. The application task entry point 266 provides the starting address of the application module to be run.

Figure 8:
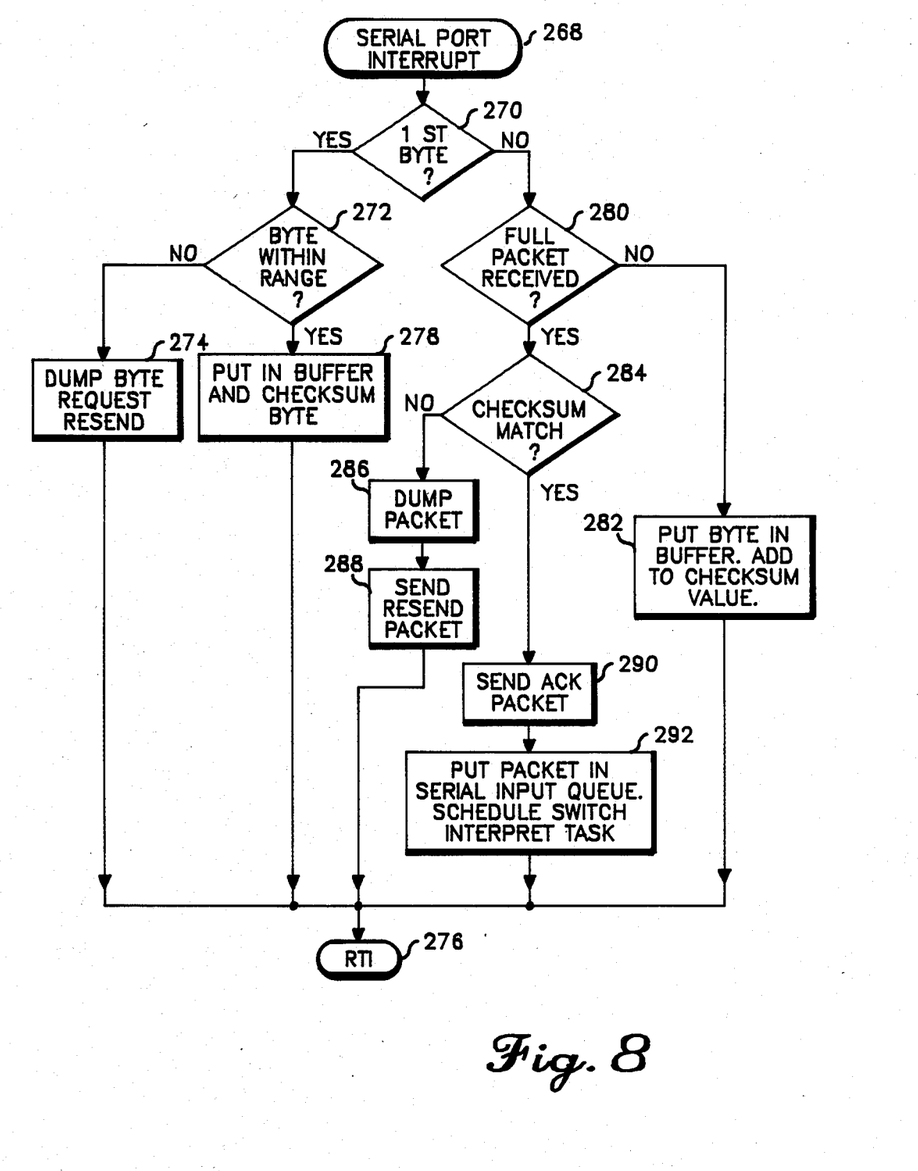
FIG. 8 is a logic flow diagram for the central control receiving data.

Referring now to FIG. 8, there is shown a logic flow diagram for microprocessor 108 on the operator MUX interface module 30 receiving data from the operator console 24. A serial port interrupt block 268 receives an interrupt request from one of nodes 24 number 1 through number M. Serial port interrupt 268 passes the signal received to a decision block 270 that determines if the byte received is the first byte in a packet. If it is the first byte, block 270 passes the signal to block 272 that determines if the byte is within the correct range. If the byte is not within range, the signal is passed to a block 274 dumping the byte and requesting a resend. Block 274 passes the signal to a return from interrupt block 276. If the byte is within range, block 272 passes the signal into a block 278 where the byte is put into a buffer and a check sum table stores the byte and passes the signal to the return from interrupt block 276.

If block 270 determines that it is not the first byte, the signal is passed to a block 280 that decides if a full packet is received. If a full packet is not received, block 280 passes the signal to a block 282 that puts the byte in a buffer and adds to the check sum value. The signal is passed then to the return from interrupt block 276. If block 280 determines a full packet has been received, the signal is passed to a block 284 that determines if there is a check sum match. If the signal does not match the value in the check sum table, block 284 passes the signal to a dump packet block 286. The signal is passed by dump packet block 286 to a block 288 where a resend request is made and passed to the return from interrupt block 276.

If there is a check sum match found by block 284, a signal is passed to block 290 that sends an acknowledging packet and passes to a block 292 that puts the packet in a serial input queue and schedules a switch interpret task. Block 292 passes the signal to return from interrupt block 276.

Figure 9:
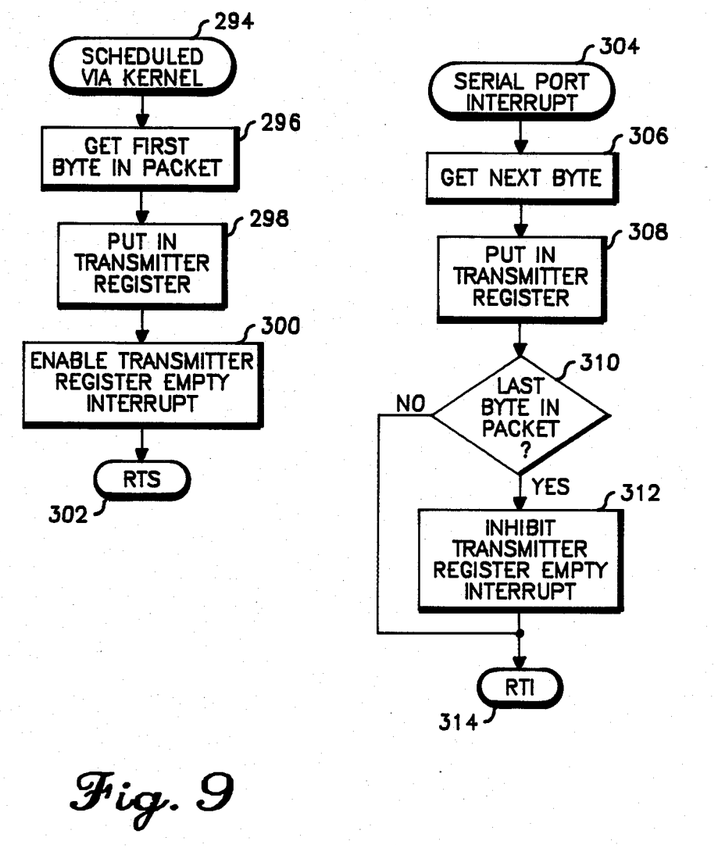
FIG. 9 is a logic flow diagram for the central control transmitting data.

Referring now to FIG. 9, there is shown a logic flow diagram for transmitting data from microprocessor 108 on the operator MUX interface module 30. A first block 294 labeled "scheduled via Kernel" is illustrated in flow diagram shown in FIG. 5. Scheduled via Kernel block 294 passes the signal to block 296 that gets the first byte in packet. Block 296 passes the signal to block 298 that puts the signal in a transmitter register and passes the signal to a block 300 that enable the transmitter register empty interrupt and passes the signal to a return from subroutine block 302 that returns the microprocessor 108 to whatever routine it was doing prior to the schedule by block 294.

A serial port interrupt block 304 receives an interrupt request and passes the signal to a block 306 that gets the next byte. Block 304 passes the signal to a put-in transmitter register block 308. A signal is passed from block 308 to a decision block 310 that determines if the last byte in packet has been transmitted. If the last byte in the packet has not been transmitted, the signal is passed to a return from interrupt block 314.

If block 310 determines the last byte in packet has been transmitted, then the signal is passed to a block 312 that inhibits the transmitter register interrupt. The signal is then passed to the return from interrupt block 314.

In summary, a time-division multiplex communications control center system has been described which efficiently controls bi-directional audio and data transfer between a plurality of nodes. The intelligence in the system is distributed whereby efficiency and reliability is provided.

While a preferred embodiment of the invention has been described in detail, it should be understood that many modifications and variations are possible that may fall within the true spirit and scope of the invention as defined in the appended claims.

All references and related applications mentioned herein are incorporated by reference herein.

What is claimed is:

1. A communications control center system for bi-directional audio and data transfer on a TDM bus coupled between a plurality of nodes comprising:
   (a) means for receiving analog audio signals from each of a plurality of sources coupled to the respective nodes, said receiving means including means for converting said analog audio signal to a digital audio signal;
   (b) time-division multiplex means coupled to each of the respective nodes for sending said digital audio signals to designated sources and for defining recurrent time slots with one of said recurrent time slots corresponding to each of the respective nodes and at least one recurrent time slot being uniquely dedicated for data transfer between each of the respective nodes;
   (c) outputting means at each of said respective nodes coupled to said time-division multiplex means for removing said digital audio signal from said time slot and means for converting said digital audio signal to analog audio signal; and
   (d) means for controlling data transfer on said dedicated data slot, wherein said means for controlling data transfer on said dedicated data slot including means for sequentially polling the plurality of nodes, means for receiving a data request signal from a requesting node, means for granting control of said dedicated slot and means for simultaneously disabling said means for sequentially polling for a predetermined period of time, means for enabling said means for sequentially polling at the next slot following said requesting node whereby each of the nodes is provided equal access to said dedicated data slot.

2. The apparatus according to claim 1 wherein said means for receiving analog audio signals from each of a plurality of sources includes separate receiver means corresponding to each of the plurality of nodes.

3. The apparatus according to claim 1 wherein said means for converting analog audio signal to a digital audio signal further comprises time slot control means.

4. The apparatus of claim 1 wherein said time-division multiple means includes timing means to define each of the time slots and address means relating each of the nodes to a particular time slot.

5. The apparatus as claimed in claim 1 including control means and memory means.

6. The apparatus as claimed in claim 5 wherein said control means and memory means include at least one microprocessor unit, random access memory means and read only memory means.

7. The apparatus according to claim 1 wherein said means for receiving said digital audio signal at designated nodes includes means for enabling selected nodes.

8. The apparatus as claimed in claim 1 wherein said means for controlling data transfer on said dedicated data slot includes microprocessor means and memory means.

9. A method for bi-directional audio and data transfer between a plurality of nodes comprising:
   (a) receiving an analog audio signal from any of the plurality of sources, each separately coupled to a respective one of the plurality of nodes;
   (b) generating recurrent time slots and assigning each of the plurality of nodes to a respective recurrent time slot with at least one time slot assigned exclusively for data transfer between the plurality of nodes;
   (c) converting said analog audio signal to a digital audio signal and inputting the same to said time-division multiplex means;
   (d) outputting said digital audio signal from said time-division multiplex means and converting said digital audio to an analog audio signal;

(e) sending said converted signal to designated sources; and
(f) controlling said dedicated data slot to provide each of the nodes equal access to transfer data between the nodes on said dedicated data slot for predetermined periods of time, wherein each node is granted access to its dedicated data slot for the predetermined period of time.

10. The method as claimed in claim 9 wherein the steps of sending said digital audio signal to designated sources:
   (a) includes enabling receiver means at designated nodes to receive said digital signal.

11. The method as claimed in claim 9 wherein the step of controlling said dedicated data slot to provide each of the nodes equal access to transfer data between the nodes on said dedicated data slot includes:
   (a) sequentially polling the plurality of nodes;
   (b) receiving a data request signal from a requesting node;
   (c) granting control of said dedicated data slot and simultaneously inhibiting said polling for a predetermined period of time;
   (d) resuming sequentially polling with the next node following said predetermined period of time.

* * * * *